Feb. 8, 1944. O. T. HUBBELL 2,341,322
DRILL GUIDE
Filed Jan. 14, 1942
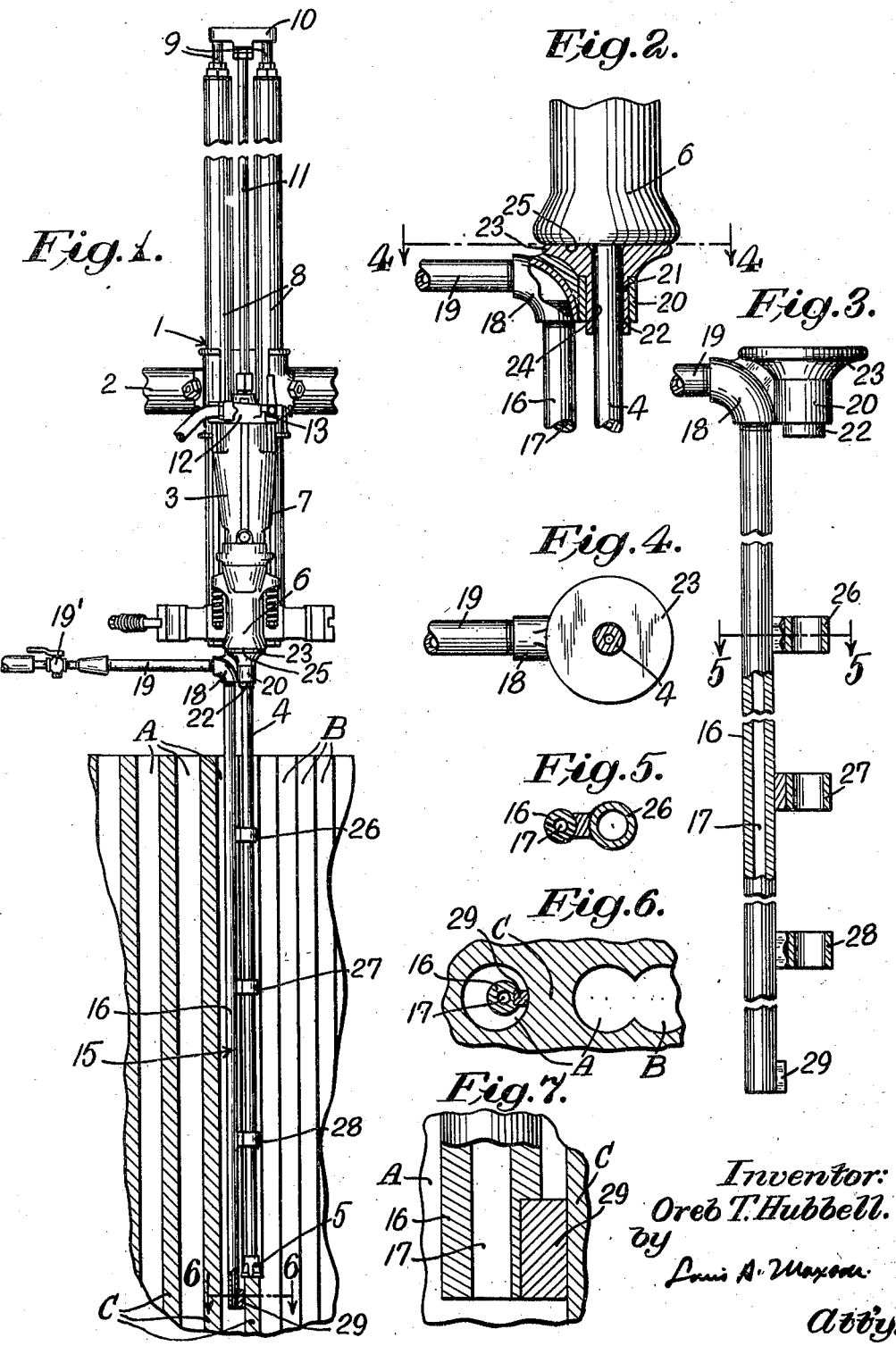
Inventor:
Oreb T. Hubbell
by
Louis A. Maxson
Atty.

Patented Feb. 8, 1944

2,341,322

UNITED STATES PATENT OFFICE 2,341,322

DRILL GUIDE

Oreb T. Hubbell, Birmingham, Ala., assignor to Sullivan Machinery Company, a corporation of Massachusetts Application January 14, 1942, Serial No. 426,769

18 Claims. (Cl. 255—62)

This invention relates to rock drills, and more particularly to improvements in a guide for the drill bit of a hammer rock drill used in drilling out the corelike partitions between a series of parallel drill holes.

In quarrying operations it is common practice to cut blocks of rock from the rock bed by drilling with a conventional rock drill a series of parallel drill holes in the rock, and thereafter drilling a series of parallel holes to cut away the corelike partitions between the parallel holes of the first series to form an elongated cleavage slot in the rock. In drilling the second series of holes to cut way the partitions, difficulty is frequently encountered due to the drill bit of the rock drill working laterally toward and into an adjacent one of the series of parallel drill holes, instead of following a line parallel to and midway between two adjacent holes. Also, accumulation of the cuttings resulting from the hole drilling operation tends to interfere with the partition cutting operation. To prevent such undesired lateral movement of the drill bit during the partition breaking operation, it is common practice to use some sort of guide which extends within one of the drill holes for guiding the drill bit, but known types of guides fail to fulfill all that is desired in that they do not only inadequately guide the bit but also frequently have their movement obstructed by cuttings in the drill hole, thereby interfering with their proper operation.

It is an object of the present invention to provide an improved guide for a drill bit whereby the cutting of the corelike partitions between a series of parallel drill holes may be facilitated. Another object is to provide an improved guide for guiding a drill bit whereby a series of parallel holes may be drilled in the corelike partitions between a series of parallel drill holes, in an extremely effective manner. A further object is to provide an improved drill bit guide having fluid pressure conducting means associated therewith whereby fluid under pressure may be conducted to the drill hole in which the guide is arranged, so that any cuttings in front of the guide which might hinder proper movement of the guide will be effectually cleared from the hole. Yet another object is to provide an improved drill bit guide which may be moved inwardly within the drill hole by engagement of the rock drill with the guide as the rock drill is fed toward the work, so that the guide may be forced into a hole from which the cuttings have been improperly cleared, or in the event the parallel drill holes are improperly spaced and are out of line. Another object is to provide an improved drill bit guide which is supported in advance of the drill bit by the core being cut away by the bit. A still further object is to provide an improved drill bit guide which is simple and rugged in construction. These and other objects and advantages of the invention will, however, hereinafter more fully appear.

In the accompanying drawing there is shown for purposes of illustration one form which the invention may assume in practice.

In this drawing:

Fig. 1 is an elevational view of a rock drill equipped with an illustrative form of the improved drill bit guide, the view showing a series of parallel drill holes in vertical section.

Fig. 2 is an enlarged fragmentary view showing the forward portion of the rock drill in engagement with the guide and with portions of the guide in vertical section to illustrate structural details.

Fig. 3 is a side elevational view, with parts broken away in section, of the improved guide.

Fig. 4 is a cross sectional view taken on line 4—4 of Fig. 2.

Fig. 5 is a cross sectional view taken on line 5—5 of Fig. 3.

Fig. 6 is an enlarged detail sectional view taken substantially on line 6—6 of Fig. 1.

Fig. 7 is an enlarged vertical sectional view of the lower portion of the guide shown in Fig. 1.

The illustrative embodiment of the invention is shown associated with a hammer rock drill, generally designated 1, of conventional form. The rock drill is preferably mounted on a quarry bar 2 and includes a drilling motor 3 for percussively actuating a drill steel 4 which carries a conventional detachable drill bit 5. The shank of the drill steel is received within a usual chuck carried within a front chuck housing 6 attached to the cylinder 7 of the drilling motor. The drilling motor is, in this instance, slidably guided on parallel feed cylinders 8 which contain usual feed pistons having their piston rods 9 projecting upwardly through the rear cylinder heads and connected by a cross yoke 10, the latter in turn being connected by a rod 11 to the rear head block 12 of the drilling motor. The rear head block 12 carries a usual throttle valve mechanism 13 which controls the supply of motive fluid to the cylinder of the drilling motor, and this valve mechanism may also control the supply of motive fluid to the feed cylinders. It is accordingly evident that the drilling motor may be fed longitudinally of the feed cylinders either forwardly or rearwardly as desired. Since the rock drill disclosed is of a type well known to those skilled in the art, further illustration and description thereof are considered unnecessary.

In rock quarrying operations it is customary, in forming a cleavage slot in the rock during the cutting out of blocks from the rock bed, initially to drill a series of parallel holes A, and thereafter to drill a series of parallel holes B in the corelike partitions C between the parallel drill holes, thereby to form the cleavage slot. In drilling the second series of parallel holes B, the drill bit has a tendency to be displaced laterally toward one of the immediately adjacent drill holes A, and the bit frequently breaks through the partition into the adjacent drill hole, thereby preventing continuation of the proper breaking away of the partition. By the provision of the improved guide, such undesired lateral displacement of the drill bit is prevented, as will later be fully pointed out.

The improved guide is generally designated 15 and comprises an elongated tubular body 16 in the form of a metal pipe or conduit, and this body is preferably cylindrical in shape and adapted to slide longitudinally within one of the drill holes A immediately adjacent the core to be cut, in the manner shown in Fig. 1. The cylindric guide body 16 has a longitudinal passage 17 extending axially therethrough for conducting a fluid, such as compressed air or liquid under pressure. At its upper end the tubular guide body is connected by a pipe elbow 18 to a supply pipe 19 provided with a manual control valve 19' and in turn connected to any suitable source of fluid under pressure. Secured to the tubular guide body, near its upper end in adjacency to the elbow 18, is a guide collar or sleeve 20 having a bore 21 which receives and has secured therein a sleevelike portion 22 on a circular flange 23. The drill steel extends through a bore 24 of the portion 22, and the front end surface 25 of the chuck housing of the drilling motor is engageable with this flange, so that as the drilling motor is fed forwardly along the parallel feed cylinders, the guide body may be forced inwardly within the drill hole in which it is positioned. Secured to the guide body, at points spaced along its length, are guide collars 26, 27 and 28 having bores through which the drill steel extends. When the drill steel is inserted within the collar bores, the drill bit is, of course, detached from the steel body. Secured to the lower end of the guide body is a slide block 29 which contacts with the corelike partition C which is being cut away by the drill bit; the slide block engaging the partition in advance of the drill bit in the manner shown. Obviously, when the drill steel is percussively actuated by the drilling motor, it has reciprocatory movement within the guiding collars with respect to the guide and the collar bores closely fit the drill steel so that the latter is adequately guided during such reciprocatory movement thereof. The circular flange 23 and the sleeve portion 22 also serve to keep the chuck housing of the drilling motor from wearing into the guide pipe and to keep the pipe from bending due to the application of a lateral pressure thereto at the time the guide is being forced into the drill hole by engagement of the chuck housing therewith. Also, the flange and sleeve keep the guide centered with respect to the chuck housing.

In operation of the guide, the rock drill 1 and guide 15 are arranged in the manner shown in Fig. 1 with respect to the block of rock in which the parallel holes A are drilled. As the drill bit 5 is percussively actuated by the drilling motor 3 and has axial reciprocatory movement within the guiding collars 26, 27 and 28 of the guide, the guide serves to hold the drill bit against lateral displacement, and as the drill bit cuts away the partition being drilled, it moves forwardly toward the work, and the guide naturally follows the drill bit into the drill hole. The fluid under pressure flowing through the guide passage 17 clears away the cuttings from the bottom of the hole, so that the guide may normally freely move forwardly as drilling progresses. The fluid under pressure flowing through the guide passage 17 also serves to cool the drill bit. In the event the cuttings are improperly cleared away from the drill hole, or the drill holes are improperly spaced and out of line and inward movement of the guide is somewhat obstructed, the drill chuck housing 6 may be moved into engagement with the circular flange 23 at the upper end of the guide to force the guide inwardly. By slidingly supporting the guide body on the partition C being cut away at a point in advance of the drill bit, it is possible to cut away a single partition, while in known prior types of guides this was impossible, since the guide was supported on an immediately adjacent partition instead of the partition actually being cut. The guide, as above stated, normally moves inwardly with the drill bit as drilling progresses, and, due to the nature of its construction, the drill hole along the partition is easily collared. The guide block 29 at the forward end of the guide body slides with pressure along the partition that is being cut in the manner shown, so that the guide is adequately supported. The drill steel may be readily detached from the guide simply by removing the drill bit from the drill steel and withdrawing the steel from the collar bores. The guide collars serve to provide a substantial bearing surface for the drill steel during the partition breaking operation, and the guide, as the drill bit is fed forwardly toward the work, maintains the drill bit midway between the immediately adjacent parallel drill holes both during collaring of a hole and also thereafter during cutting away of a partition, so that the drill bit may be fed in a straight path, thereby to break away the partition in an extremely effective manner.

As a result of this invention it will be noted that an improved drill bit guide is provided which may be readily and quickly attached in guiding relation with a drill steel and presents a substantial bearing surface whereby the drill bit is maintained in the desired path. It will further be evident that by the provision of means on the guide engageable by the chuck housing of the drilling motor of the latter, as it is fed forwardly toward the work, shoves the guide into the drill hole, a feature of decided advantage when the hole is improperly cleared of its cuttings or drill holes are improperly spaced and out of line. Also, by the provision of means for conducting fluid under pressure to the drill hole, the latter is normally cleared of its cuttings so that the guide may move inwardly without obstruction as the drill bit advances toward the work. Further, by slidingly supporting the inner end of the guide on the partition being cut away by the drill bit in advance of the latter, it is possible to break out the partition between a single pair of parallel drill holes, and the guide is at all times adequately supported. Other uses and advantages of the improved guide will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A guide of the character described, comprising an elongated tubular guide member adapted to extend into and move longitudinally within a drill hole immediately adjacent to a partition to be drilled and having thereon guiding elements for a drill steel, and through which cleansing fluid is adapted to be conducted to the bottom of the drill hole, said tubular guide member having a member thereon slidingly engageable with a partition being drilled in advance of the drill bit.

2. A guide of the character described, comprising an elongated guide body adapted to extend into a drill hole in direct supported engagement with the walls of the latter and having guiding means for a drill steel, and means on said guide body adapted for direct engagement by a drilling motor which actuates the drill steel when the motor assumes a predetermined position with respect to the guide for forcing the guide body into the drill hole.

3. A guide of the character described, comprising an elongated guide body adapted to extend into a drill hole in direct supported engagement with the walls of the latter and having guiding means for a drill steel, means on said guide body adapted for direct engagement by a drilling motor which actuates the drill steel when the motor assumes a predetermined position with respect to the guide for forcing the guide body into the drill hole, and fluid conducting means including a passage extending longitudinally through said guide body for conducting cleansing fluid to the bottom of the drill hole for clearing away the cuttings in advance of said guide body.

4. An apparatus for cutting away core like partitions between a series of parallel drill holes, comprising means for guiding a drill bit during the partition cutting operation including an elongated guide member adapted to enter a drill hole immediately adjacent the partition being cut and at its lower end to slidingly engage the partition being cut in advance of the drill bit, and means associated with said guide member for centering the drill bit midway between the parallel drill holes separated by the partition being cut away.

5. An apparatus for cutting away corelike partitions between a series of parallel drill holes, comprising a drilling motor for actuating a drill bit, and guiding means for said bit including an elongated guide member adapted to enter a drill hole immediately adjacent the partition being cut and at its lower end to slidingly engage the partition being cut in advance of the drill bit, means associated with said guide member for centering the drill bit midway between the parallel drill holes separated by the partition being cut away, and means on the upper end of said guide member engageable by the drilling motor whereby the latter may force the guide inwardly within the drill hole.

6. A drill bit guide comprising, in combination, a drill steel carrying a drill bit, an elongated guide member movable with said drill steel and bit toward the work and adapted to extend within a drill hole, and a series of guide collars spaced longitudinally on said guide member through which said drill steel extends for guiding the drill bit, said collars having guiding engagement with the drill steel at a plurality of longitudinally spaced points.

7. A drill bit guide comprising, in combination, a drill steel carrying a drill bit, an elongated guide member movable with said drill steel and bit toward the work and adapted to extend and be supported within a drill hole, a series of guide collars spaced longitudinally on said guide member through which said drill steel extends for guiding the drill bit, said collars having guiding engagement with the drill steel at a plurality of longitudinally spaced points, and fluid conducting means including a passage extending longitudinally through said guide member for conducting cleansing fluid to the drill hole in advance of said guide member.

8. A device of the character described comprising, in combination, a drilling motor for percussively actuating a drill steel, and a guide for the drill steel including an elongated guide member adapted to extend and be supported within a drill hole, and means on said guide member through which the drill steel freely extends and engageable by said drilling motor when the latter has moved into a predetermined relation with respect to the guide for moving said guide member inwardly within the drill hole.

9. An apparatus for breaking out corelike partitions between a series of parallel drill holes, including an actuator for a drill bit, and a drill bit guide adapted to extend into a drill hole immediately adjacent to the partition being broken away and having a bottom support for slidingly engaging the partition being broken away in advance of the drill bit.

10. An apparatus for breaking out corelike partitions between a series of parallel drill holes, including an actuator for a drill bit, a drill bit guide adapted to extend into a drill hole immediately adjacent to the partition being broken away and having a bottom support for slidingly engaging the partition being broken away in advance of the drill bit, and fluid conducting means including a passage extending longitudinally through said guide for conducting cleansing fluid to the bottom of the drill hole in which said guide is positioned.

11. An apparatus for breaking out corelike partitions between a series of parallel drill holes, including an actuator for a drill bit, a drill bit guide adapted to extend into a drill hole immediately adjacent to the partition being broken away and having a bottom support for slidingly engaging the partition being broken away in advance of the drill bit, and abutment means on said guide engageable by said drill bit actuator for moving said guide inwardly within the drill hole.

12. An apparatus for breaking out corelike partitions between a series of parallel drill holes, including an actuator for a drill bit, a drill bit guide adapted to extend into a drill hole immediately adjacent to the partition being broken away and having a bottom support for slidingly engaging the partition being broken away in advance of the drill bit, fluid conducting means including a passage extending longitudinally through said guide for conducting cleansing fluid to the bottom of the drill hole in which said guide is positioned, and abutment means on said guide engageable by said drill bit actuator for moving said guide inwardly within the drill hole.

13. An apparatus for cutting away corelike partitions between a series of parallel drill holes, including an actuator for a drill bit, and guiding means for said drill bit including an elongated guide tube adapted to enter a drill hole immediately adjacent the partition being cut away and to be slidingly supported at its lower end by the partition being cut away in advance of the drill bit, and means for conducting cleansing fluid through said guide tube to the bottom of the hole to clear away the cuttings in advance of said guide tube.

14. An apparatus for cutting away corelike partitions between a series of parallel drill holes, comprising an actuator for a drill bit, and guiding means for said drill bit including an elongated guide tube adapted to enter a drill hole immediately adjacent the partition being cut away and to be slidingly supported at its lower end by the partition being cut away in advance of the drill bit, means for conducting cleansing fluid through said guide tube to the bottom of the hole to clear away the cuttings in advance of said guide tube, and a flange secured to the upper end of said guide tube and engageable by the drill bit actuator for moving said guide tube inwardly within the drill hole in which it is positioned.

15. An apparatus for cutting away corelike partitions between a series of parallel drill holes, comprising an actuator for a drilling implement, and guiding means for the drilling implement and relative to which said actuator is movable, said guiding means including an elongated guide tube adapted to enter a drill hole immediately adjacent the partition being cut away, means for conducting cleansing fluid through said guide tube to the bottom of the hole to clear away the cuttings in advance of said guide tube, and a flange secured to the upper end of said guide tube and having an opening through which said drilling implement freely extends, said flange being engageable by said actuator when the latter assumes a predetermined position with respect to said guiding means for moving said guide tube inwardly within the drill hole in which it is positioned.

16. A guide of the character described, comprising an elongated guide body adapted to extend into and be supported within a drill hole and having guiding means for a drilling implement, and means on said guide body adapted for engagement by a drilling motor which actuates the drilling implement when the motor assumes a predetermined position with respect to the guide for forcing the guide body into the drill hole, said drilling implement upon actuation thereof being freely movable relative to said means engaged by the motor, said motor in other positions being movable relative to the guide during the guiding operation.

17. A guide of the character described, comprising an elongated guide body adapted to extend into and be supported within a drill hole and having guiding means for a drilling implement, and means on said guide body having an opening through which said drilling implement freely extends and adapted for engagement by a drilling motor which actuates the drilling implement when the motor assumes a predetermined position with respect to the guide for forcing the guide body into the drill hole.

18. A device of the character described comprising, in combination, a drilling motor for percussively actuating a drilling implement, and a guide for the drilling implement and relative to which the drill motor is movable, said guide including an elongated guide member adapted to extend and be supported within a drill hole, and means on said guide member engageable by the forward end of said drilling motor when the latter assumes a predetermined position with respect to the guide for moving said guide member independently of said drilling implement inwardly within the drill hole.

OREB T. HUBBELL.